US005094986A

United States Patent [19]
Matsumoto et al.

[11] Patent Number: 5,094,986
[45] Date of Patent: * Mar. 10, 1992

[54] WEAR RESISTANT CERAMIC WITH A HIGH ALPHA-CONTENT SILICON NITRIDE PHASE

[75] Inventors: Roger L. K. Matsumoto, Newark; Allan B. Rosenthal, Wilmington, both of Del.

[73] Assignee: Hercules Incorporated, Wilmington, Del.

[*] Notice: The portion of the term of this patent subsequent to Jun. 11, 2008 has been disclaimed.

[21] Appl. No.: 592,713

[22] Filed: Oct. 4, 1990

Related U.S. Application Data

[63] Continuation-in-part of Ser. No. 336,397, Apr. 11, 1989, Pat. No. 5,023,214.

[51] Int. Cl.$^5$ .............................................. C04B 35/58
[52] U.S. Cl. ........................................ 501/97; 501/96; 501/98
[58] Field of Search ................. 501/96, 97, 98; 51/309

[56] References Cited

U.S. PATENT DOCUMENTS

| | | | |
|---|---|---|---|
| 3,409,417 | 11/1968 | Vatis | 29/182.5 |
| 4,093,687 | 6/1978 | Greskovich et al. | 264/65 |
| 4,124,402 | 11/1978 | Greskovich et al. | 106/73.5 |
| 4,332,909 | 6/1982 | Nishida et al. | 501/97 |
| 4,407,971 | 10/1983 | Kamatsu et al. | 501/97 |

FOREIGN PATENT DOCUMENTS

| | | |
|---|---|---|
| 262654 | 4/1981 | European Pat. Off. |
| 71997 | 2/1983 | European Pat. Off. |
| 57-200266 | 8/1982 | Japan |
| 64269 | 4/1983 | Japan |
| 58-64269 | 4/1983 | Japan |
| 144058 | 8/1983 | Japan |
| 176109 | 10/1983 | Japan |
| 477379 | 10/1969 | Switzerland |

Primary Examiner—William R. Dixon, Jr.
Assistant Examiner—Chris Gallo
Attorney, Agent, or Firm—Joanne W. Patterson

[57] ABSTRACT

Disclosed is a wear resistant sintered ceramic product comprising (a) 40–98 weight percent silicon nitride having a high alpha-phase content, (b) 2–60 weight percent of a silicide of iron, cobalt or nickel and (c) up to 20 weight percent of at least one oxide, nitride, or silicate of an element of IUPAC groups 2, 3, 4, 13 or the lanthanide series. A method for making such a product is also disclosed.

13 Claims, 1 Drawing Sheet

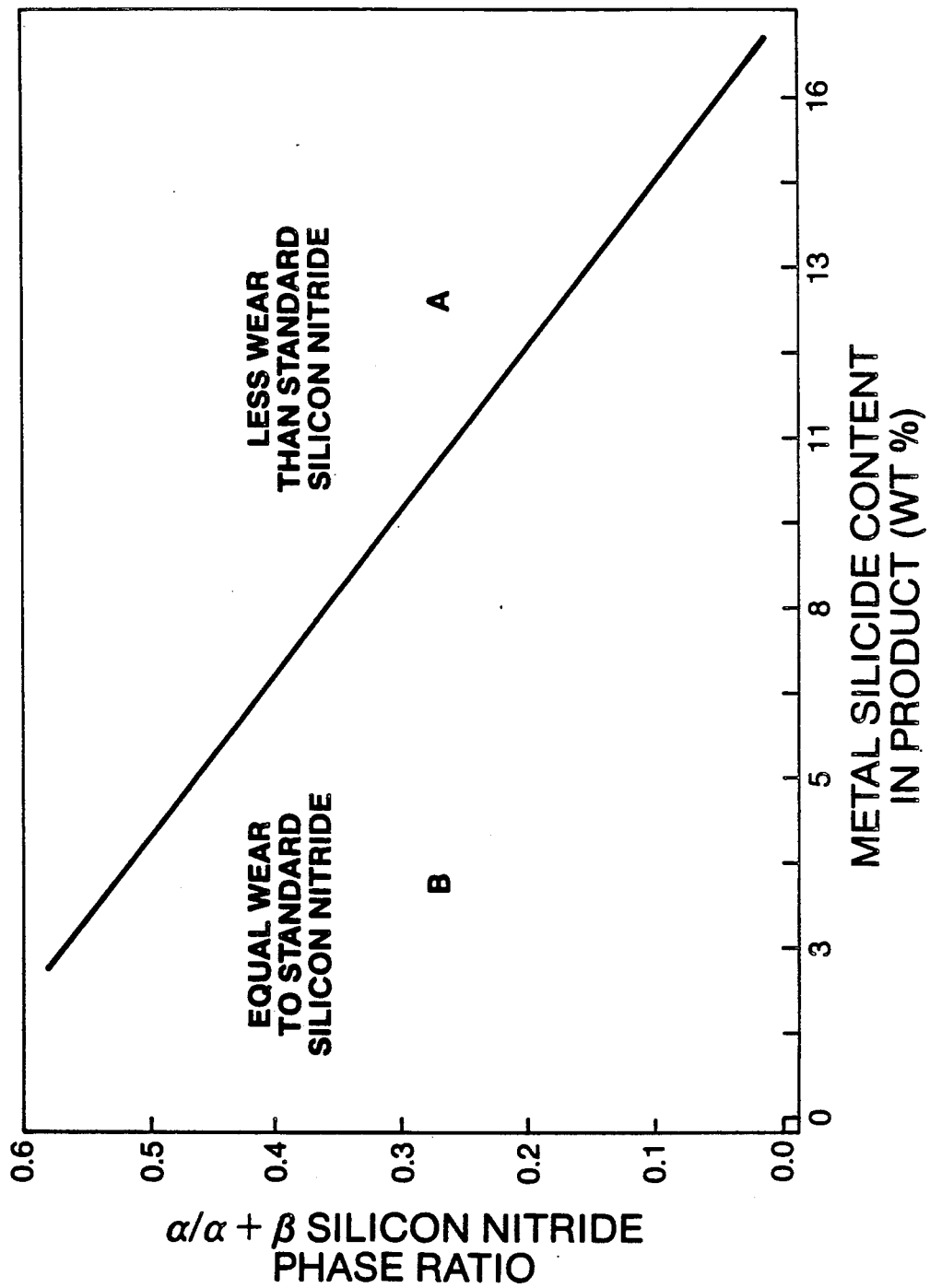

WEAR RESISTANT CERAMIC WITH A HIGH ALPHA-CONTENT SILICON NITRIDE PHASE

This application is a continuation-in-part of Ser. No. 07/336,397 filed Apr. 11, 1989 now U.S. Pat. No. 5,023,214.

FIELD OF THE INVENTION

This invention relates to sintered silicon nitride ceramics. This invention particularly relates to sintered silicon nitride ceramic products suitable for making wear resistant cutting tools.

BACKGROUND OF THE INVENTION

Silicon nitride is of great interest for structural and electronic applications because of its excellent high temperature strength, good thermal shock resistance, good wear resistance and chemical inertness. Silicon nitride materials have been traditionally fabricated by one of three methods: (1) the direct nitridation of silicon powder at high temperatures, (2) densification of commercially available silicon nitride powder at high temperatures by the addition of metal oxide powders known as sintering aids that promote densification of the silicon nitride by providing a liquid phase during sintering and (3) densification of commercially available silicon nitride powder at high temperatures and pressures, a process known as hot pressing. These silicon nitride materials have been used in structural applications such as cutting tools and gas turbines.

Although silicon nitride ceramics having satisfactory mechanical properties at ambient and modestly high temperatures are available, many are not suitable for high temperature applications because their toughness, wear resistance and strength are often degraded at temperatures greater than 1000° C. In the case of cutting tool inserts, wear resistance is a particularly important property. Undesirable phase transformations within the insert and chemical reactivity with the metal being worked on cause a deterioration in properties as the temperature rises at the high feeding and rotating speeds used for milling and turning operations.

Various methods have been proposed for improving the high temperature properties of silicon nitride ceramics. For example, U.S. Pat. Nos. 4,093,687 and 4,124,402 disclose a process for preparing high density polycrystalline silicon nitride suitable for high temperature structural applications by hot pressing silicon nitride and magnesium silicide in the absence of oxide additives. Varying amounts of alpha- and β-phase silicon nitride are present in the product, depending on the temperature used. U.S. Pat. No. 4,407,971 discloses a sintered silicon nitride body having excellent mechanical strength at high temperatures and made from a mixture of silicon nitride, aluminum oxide, yttrium oxide, aluminum nitride and small amounts of metal silicide. Japanese unexamined patent application JP 58-176109 discloses alpha-type silicon nitride having a large specific surface area that is useful for heat resistant structural materials. The silicon nitride is produced by combusting amorphous silicon nitride and/or silicon diimide in the presence of a high melting point metal silicide such as Mo silicide. JP 58-064269 discloses the preparation of a sintered silicon nitride body having excellent strength and hardness at high temperatures from a mixture of 1-20 wt. % $Al_2O_3$ and $Y_2O_3$, 5-40 wt. % of a metal silicide and the balance silicon nitride. However, none of these references discloses the production of wear resistant ceramic articles with a high alpha-content silicon nitride phase and also containing silicides of Fe, Co or Ni that are primarily composed of high metal content silicides.

SUMMARY OF THE INVENTION

It has now been found that a sintered ceramic product exhibiting high strength, wear resistance, toughness and hardness at elevated temperatures can be prepared by (1) intimately mixing a powder mixture consisting essentially of (a) from about 50 to about 98 percent silicon nitride, (b) from about 1 to about 50 percent of at least one metal selected from the group consisting of Fe, Ni and Co, or an oxide or alloy thereof, and (c) from 0.02 to about 20 percent of at least one oxide, nitride or silicate of an element selected from IUPAC groups 2, 3, 4, 13 or the lanthanide series, all percentages being by weight based on the total weight of the powder mixture, (2) reacting the components of the powder mixture by heating to a temperature of 1300°-1700° C. in a non-oxidizing atmosphere until component 1(b) is converted to its corresponding silicides, and (3) maintaining the powder mixture at a temperature of 1300°-1700° C. in the non-oxidizing atmosphere until the composition formed in (2) densifies. The product that is formed has a composition falling within area A of FIG. 1 and is composed of high metal content silicide phases inter-dispersed in a silicon nitride matrix.

BRIEF DESCRIPTION OF THE DRAWING

FIG. 1 is a graph plotting the alpha-phase content of the silicon nitride matrix, expressed as the ratio $\alpha/(\alpha+\beta)$, against the metal silicide content of the sintered product in weight %.

DETAILED DESCRIPTION OF THE INVENTION

The silicon nitride used in the process of this invention can be any commercially available silicon nitride powder. The silicon nitride is used in an amount of from about 50 to about 98 percent, based on the total weight of the composition.

Other refractory compounds, which can be chemically stable or unstable, can replace up to 50% by weight of the silicon nitride. For example, nitrides such as aluminum nitride, titanium nitride and boron nitride; carbides such as silicon carbide, titanium carbide and boron carbide; and borides such as titanium diboride, molybdenum diboride, and zirconium diboride can be used to replace silicon nitride. The refractory compound can be chosen to enhance a particular property of the resulting composite. For example, including titanium carbide or silicon carbide in the composition will give a harder product.

The silicon nitride powder is mixed with from about 1 to about 50 percent, preferably 5-25 percent, based on the total weight of the composition, of Fe, Ni or Co metal. An oxide of the metal or an alloy of these metals with each other or with another metal can also be used.

The powder mixture also includes from 0.02 to about 20 percent, preferably from 1 to about 10 percent, based on the total weight of the composition, of a sintering aid. Amounts higher than about 20% degrade the mechanical properties of the sintered product. The sintering aid is an oxide, nitride or silicate of an element of IUPAC groups 2, 3, 4, 13 or the lanthanide series, or mixtures thereof. Oxides of aluminum, magnesium, hafnium, calcium, strontium, zirconium and yttrium are preferred. A combination of aluminum oxide and yttrium oxide is most preferred. The silicate sintering aid can be added as such or can be formed in situ by the reaction of an oxide or nitride sintering aid with the silica that is always present on the surface of the silicon nitride powder. When a nitride sintering aid is used, it is sometimes desirable to add silica in addition to that which is inherently present on the surface of the silicon nitride. IUPAC group 1 oxides can be substituted for any of the oxide, nitride or silicate sintering aids in an amount of up to 50% by weight.

A binder can be added to the powder mixture as a processing aid during subsequent molding of the material. Suitable binders include, for example, paraffin and other waxes. The amount of binder used is preferably less than 5% by weight, based on the total weight of the composition.

In order to impart optimum properties to the sintered product, the ingredients used to prepare the initial mixture should be finely divided, preferably having a particle size of less than 5 microns, most preferably less than 1 micron.

In order to produce a sintered product of suitable quality, it is important that the finely divided ingredients of the initial mixture be intimately mixed. The ingredients are placed in a mill with a sufficient volume of an aqueous or non-aqueous liquid to form a thick slurry and are milled for 1-48 hours, depending on the particle size desired. Typical liquids useful for non-aqueous milling include, but are not limited to, ethanol, 1,1,1-trichloroethane and methylene chloride. A commercially available dispersant such as HYPERMER KD-2 amine dispersant (ICI Americas) can be added if desired. Suitable mills include, but are not limited to, ball mills, vibratory mills, and attrition mills. Ball and vibratory mills are preferred.

After milling, the slurry that is produced is spray dried to form a free flowing powder. Agglomerates are then removed by sieving the powder through a 200 mesh screen.

The powder mixtures of this invention are preferably reacted and densified by simultaneously heating and pressing. The preferred processing techniques are therefore hot pressing, hot isostatic pressing and gas pressure sintering.

The components of the powder mixture are heated to a temperature of 1300°-1700° C. until the silicon nitride reacts with the metal, or an oxide or alloy thereof, to form the corresponding high metal content silicides. High metal content silicides of iron are $Fe_3Si$ and $Fe_5Si_3$; of cobalt $Co_2Si$ and of nickel $Ni_3Si$, $Ni_5Si$, $Ni_2S$ and $Ni_3Si_2$. All other metal silicides are referred to as low metal content silicides. Further reactions result in partial conversion to lower metal content silicides. However, a significant fraction of the high metal content silicide, typically greater than 50%, is retained. The mixture of high and low metal content silicides is referred to as "mixed metal silicides" in this specification. If one simply mixed silicon nitride with commercially available metal silicides, which always contain the lowest metal content silicide phases, e.g., $CoSi_2$, and $FeSi_2$, only the low metal content silicides would be present in the final product.

The reaction is carried out under a non-oxidizing atmosphere such as nitrogen, hydrogen or helium to prevent oxidation of the metals and the silicon nitride. A nitrogen atmosphere is preferred. The reaction is preferably carried out at a pressure of at least 500 psi, most preferably 2000-6000 psi.

Once the reaction of the silicon nitride and the metal is initiated, the ceramic material is densified by increasing the temperature and pressure within the ranges specified above while maintaining the non-oxidizing atmosphere. If the sintering temperature is too low, densification will be incomplete. If the sintering temperature is too high, the silicon nitride will decompose. The presence of the metal silicides makes it possible to densify at lower temperatures, which in turn allows for retention of a high alpha-phase content in the silicon nitride.

The sintered ceramic product comprises (a) from about 40 to about 98 percent silicon nitride, with an $\alpha/\alpha+\beta$ ratio within area A of FIG. 1, and (b) from about 2 to about 60 percent of high metal content mixed silicides of at least one metal selected from the group consisting of iron, nickel and cobalt, and (c) up to about 20 percent of at least one oxide, nitride or silicate of an element selected from IUPAC group 2, 3, 4, 13 or the lanthanide series, all percentages being by weight based on the total weight of the product. It is important that the composition of the product falls within area A in FIG. 1 in order to obtain a wear resistant product.

The product is composed of a silicon nitride matrix and microscopic "islands" of mixed metal silicides. In contrast to materials taught in the prior art, there is no continuous three dimensional metal or metal oxide phase in the sintered product of this invention. While the exact mechanism is not known, this morphology is believed to occur via a high temperature disproportionation reaction promoted by the sintering aid. The sintering aid provides a liquid phase during heating, which acts as a high temperature "solvent" for both the nitride and the metal (or metal oxide or alloy) and promotes the reaction of silicon nitride with the metal to form mixed metal silicides. In the case of cobalt, the X-ray diffraction pattern of the sintered product indicates that the product is composed of silicon nitride, CoSi and $Co_2Si$.

The sintered ceramic material of this invention has a wide variety of applications in the structural ceramics area. Because the material has a theoretical density of less than 5, it is suitable for uses where a high strength/weight ratio is important. The unique mechanical properties of the product, particularly low wear, make it especially suited for use in the manufacture of cutting tools. The material can also be used for any other application that requires hard, low abrasion components, e.g., ball bearings, bearing races and roller bearings.

EXAMPLES 1-16

Samples (500 g) of the compositions listed below are milled for 24 hours in equal concentrations by volume of 1,1,1-trichloroethane on a vibratory mill. The resulting slurries are spray dried to form a free flowing powder. The powders are hot pressed at 4000 psi and 1500° C. under nitrogen to produce a 45 cm×45 cm×6 mm billet (Examples 1-14). In Examples 15 and 16, the powder is cold pressed at 5000 psi and sintered at atmospheric pressure under nitrogen at 1600° C. The density of each billet is determined using a displacement technique (ASTM C 373-56) and the Rockwell A hardness is measured. The flexural strength of the product of Example 14 is measured using test method MIL-STD 1942 and is found to be 619 MPa. The results are shown in Table I.

TABLE I

| Example No. | Composition of Powder (wt. %) | | | | | | | | | Product | |
|---|---|---|---|---|---|---|---|---|---|---|---|
| | $Si_3N_4$ | Co | $Al_2O_3$ | MgO | CaO | SrO | $ZrO_2$ | $Y_2O_3$ | $SiO_2$ | Density (g/cc) | Hardness (Rockwell A) |
| 1 | 78.0 | 22.0 | — | — | — | — | — | — | — | 3.09 | Brittle |
| 2 | 74.0 | 21.0 | 5.0 | — | — | — | — | — | — | 3.15 | 83.2 |
| 3 | 73.2 | 22.5 | 2.5 | 1.8 | — | — | — | — | — | 3.48 | 92.5 |
| 4 | 72.5 | 22.5 | 2.5 | — | 2.5 | — | — | — | — | 3.33 | 92.0 |
| 5 | 70.6 | 22.5 | 2.4 | — | — | 4.5 | — | — | — | 3.31 | 92.0 |
| 6 | 71.5 | 22.5 | 2.5 | 0.9 | — | — | 2.7 | — | — | 3.48 | 92.5 |
| 7 | 71.2 | 22.5 | 2.5 | — | 1.2 | — | 2.7 | — | — | 3.37 | 93.0 |
| 8 | 70.3 | 22.5 | 2.3 | — | — | 2.2 | 2.6 | — | — | 3.40 | 92.0 |
| 9 | 71.4 | 22.5 | 4.5 | 1.7 | — | — | — | — | — | 3.42 | 93.5 |
| 10 | 70.8 | 22.5 | 4.4 | — | 2.3 | — | — | — | — | 3.30 | 92.0 |
| 11 | 69.0 | 22.5 | 4.3 | — | — | 4.2 | — | — | — | 3.38 | 91.2 |
| 12 | 70.2 | 22.1 | — | 7.7 | — | — | — | — | — | 3.63 | 92.5 |
| 13 | 92.9 | $(2.3)^a$ | 3.5 | 1.3 | — | — | — | — | — | 3.40 | 92.0 |
| 14 | 70.7 | 22.4 | 2.3 | — | — | — | — | 4.6 | — | 3.57 | 93.4 |
| 15 | 83.4 | $(8.9)^b$ | 2.2 | — | — | — | — | 5.4 | — | 2.97 | 88.5 |
| 16 | 64.2 | 22.5 | $(2.3)^c$ | — | — | — | — | $(5.1)^d$ | 5.9 | 3.20 | 88.0 |

$^a$CoO instead of Co
$^b$Fe instead of Co
$^c$AlN instead of $Al_2O_3$
$^d$YN instead of $Y_2O_3$

EXAMPLES 17-29

Powder mixtures were prepared as described in the previous examples. The composition of the mixtures is shown in Table II. The powders are uniaxially hot pressed in graphite dies under a nitrogen atmosphere at the temperatures and pressures indicated.

The $\alpha/\alpha+\beta$ phase content was analyzed by X-ray diffraction (XRD) using the intensities of (102) $\alpha$, (210) $\alpha$, (101) $\beta$, and (210) $\beta$ peaks. The $\alpha/(\alpha+\beta)$ phase ratios are shown in Table III, along with the hardness on the Rockwell A scale ($R_A$) and the wear performance relative to the standard. XRD also shows the presence of $Co_2Si$ and $CoSi$ in approximately equal proportions. No $CoSi_2$ is detected. The standard is a commercial silicon nitride cutting tool insert that does not contain Co. There is no correlation between the hardness of the cutting tool and the relative wear performance.

The cutting tool inserts were made from the powder mixtures of this invention as well as the standard. The insert is mounted in a tool holder that is moved along the length of a cast iron workpiece, which is mounted on a lathe and turned at predetermined speeds against the insert. Cutting is performed dry. The rate at which the insert is moved by the tool holder into the length of the workpiece from one end to the other parallel to its axis is 0.010 inch per revolution and the depth of the cut is 0.075 inch. The rate of metal removal for all cuts is 2000 surface feet per minute. The average nose and flank wear of the insert is measured after each cut. Cuts are made until 0.020 inch of wear is passed on the cutting tool.

Due to the changing nature of the cast iron workpiece, an absolute numerical comparison between the standard and the cutting tool inserts made by the process of this invention is not meaningful. However, when the relative wear performance results are superimposed upon a plot of the metal silicide content of the product vs. the $\alpha/(\alpha+\beta)$ phase ratio (FIG. I), it becomes clear that a tool whose wear performance falls within Area A of the figure exhibits much lower wear than the standard.

TABLE II

| EXAMPLE | COMPOSITION OF POWDER (weight %) | | | | PROCESSING CONDITIONS | | |
|---|---|---|---|---|---|---|---|
| | $Si_3N_4$ | $Al_2O_3$ | $Y_2O_3$ | Co | TEMP (°C.) | PRESSURE (psi) | TIME (min) |
| STD. | Commercial product | | | 0 | — | — | — |
| 17 | 88.3 | 2.9 | 5.8 | 3 | 1650 | 500 | 30 |
| 18 | 88.3 | 2.9 | 5.8 | 3 | 1700 | 500 | 30 |
| 19 | 84.6 | 2.8 | 5.6 | 7 | 1600 | 500 | 30 |
| 20 | 84.6 | 2.8 | 5.6 | 7 | 1700 | 500 | 30 |
| 21 | 84.6 | 2.8 | 5.6 | 7 | 1650 | 500 | 30 |
| 22 | 81.9 | 2.7 | 5.4 | 10 | 1600 | 500 | 30 |
| 23 | 81.9 | 2.7 | 5.4 | 10 | 1600 | 4000 | 60 |
| 24 | 81.9 | 2.7 | 5.4 | 10 | 1500 | 4000 | 60 |
| 25 | 81.9 | 2.7 | 5.4 | 10 | 1650 | 500 | 30 |
| 26 | 80.1 | 2.6 | 5.3 | 12 | 1500 | 500 | 30 |
| 27 | 80.1 | 2.6 | 5.3 | 12 | 1550 | 500 | 30 |
| 28 | 80.1 | 2.6 | 5.3 | 12 | 1600 | 500 | 30 |
| 29 | 80.1 | 2.6 | 5.3 | 12 | 1650 | 500 | 30 |

TABLE III

| EXAMPLE | $\alpha/(\alpha + \beta)$ CONTENT IN PRODUCT | HARDNESS ($R_A$) | RELATIVE WEAR PERFORMANCE |
|---|---|---|---|
| STD. | 0.10 | 94.5 | = |
| 17 | 0.25 | 94.0 | ≦ |
| 18 | 0.05 | 93.6 | = |
| 19 | 0.40 | 94.6 | < |
| 20 | 0.15 | — | = |
| 21 | <0.05 | — | = |
| 22 | 0.58 | 93.5 | << |
| 23 | 0.57 | 94.0 | < |
| 24 | 0.48 | 93.3 | < |
| 25 | 0.08 | 93.0 | ≦ |
| 26 | 0.57 | 93.0 | << |
| 27 | 0.50 | 93.1 | << |

TABLE III-continued

| EXAMPLE | α/(α + β) CONTENT IN PRODUCT | HARDNESS ($R_A$) | RELATIVE WEAR PERFORMANCE |
|---|---|---|---|
| 28 | 0.15 | 92.9 | < |
| 29 | 0.08 | 92.5 | ≦ |

KEY TO SYMBOLS:
= Same relative value as standard
≦ Slightly lower wear than standard
< Lower wear than standard
<< Much lower wear than standard

What we claim and desire to protect by Letters Patent is:

1. In a sintered ceramic product consisting essentially of
   (a) from about 40 to about 98 percent silicon nitride,
   (b) from about 2 to about 60 percent of silicides of at least one metal selected from the group consisting of iron, nickel and cobalt, and
   (c) up to about 20 percent of at least one oxide, nitride or silicate of an element selected from IUPAC group 2, 3, 4, 13 or the lanthanide series, all percentages being by weight based on the total weight of the product,
the improvement comprising an alpha-to-beta ratio of silicon nitride in the sintered ceramic product that falls within area A of FIG. 1 and a content of high metal-content silicides in the sintered ceramic product that is at least 50% by weight of the silicides present.

2. The sintered product of claim 1 wherein up to 50% by weight of the silicon nitride is replaced by at least one refractory carbide, nitride other than silicon nitride, or boride.

3. In a process for preparing a sintered ceramic product comprising
   (1) intimately mixing a powder mixture consisting essentially of
      (a) from about 50 to about 98 percent silicon nitride,
      (b) from about 1 to about 50 percent of at least one metal selected from the group consisting of iron, nickel and cobalt, or an oxide or alloy thereof, and
      (c) from 0.02 to about 20 percent of at least one oxide, nitride or silicate of an element selected from IUPAC group 2, 3, 4, 13 or the lanthanide series, all percentages being by weight based on the total weight of the powder mixture,
   (2) reacting the components of the powder mixture by heating to a temperature of 1300°-1700° C. in a non-oxidizing atmosphere until component 1(b) is completely converted to its corresponding silicides, and
   (3) maintaining the powder mixture at a temperature of 1300°-1700° C. in the non-oxidizing atmosphere until the composition formed in (2) densifies,
the improvement comprising reacting the components of the powder mixture until the alpha-to-beta ratio of silicon nitride in the sintered ceramic product falls within area A of FIG. 1 and at least 50% by weight of the silicides in the sintered ceramic product are high metal-content silicides.

4. The process of claim 3 wherein the heating of the powder mixture is carried out at a pressure of at least 500 psi.

5. The process of claim 4 wherein the pressure is 2000-6000 psi.

6. The process of claim 3 wherein the non-oxidizing atmosphere is a nitrogen atmosphere.

7. The process of claim 3 wherein up to 50% by weight of the silicon nitride is replaced by at least one refractory carbide, nitride other than silicon nitride, or boride.

8. The process of claim 3 wherein the powder mixture comprises 50-93% by weight of silicon nitride, 5-25% by weight of at least one metal selected from the group consisting of iron, nickel and cobalt, 1-10% by weight of at least one oxide of IUPAC group 3 elements or the lanthanide series, and 1-5% by weight of aluminum oxide.

9. The process of claim 8 wherein fully stabilized zirconium oxide, partially stabilized zirconium oxide or hafnium oxide is substituted for all or part of the oxide of IUPAC group 3 elements or the lanthanide series.

10. The process of claim 3 wherein the powder mixture comprises 50-93% by weight of silicon nitride, 5-25% by weight of at least one metal selected from the group consisting of iron, nickel and cobalt, 1-10% by weight of at least one oxide of IUPAC group 2 elements, and 1-5% by weight of aluminum oxide.

11. The process of claim 10 wherein fully stabilized zirconium oxide or hafnium oxide is substituted for all or part of the oxide of IUPAC group 2 elements.

12. A wear resistant cutting tool prepared from the sintered ceramic product of claim 1.

13. A wear resistant cutting tool prepared from the sintered ceramic product of claim 2.

* * * * *

UNITED STATES PATENT AND TRADEMARK OFFICE
CERTIFICATE OF CORRECTION

PATENT NO. : 5,094,986
DATED : March 10, 1992
INVENTOR(S) : Roger L. K. Matsumoto and Allan B. Rosenthal It is certified that error appears in the above-identified patent and that said Letters Patent is hereby corrected as shown below:

In the Claims, Col. 8, line 44, after "zirconium oxide" insert --, partially stabilized zirconium oxide--.

Signed and Sealed this

First Day of June, 1993

Attest:

MICHAEL K. KIRK

Attesting Officer

Acting Commissioner of Patents and Trademarks